United States Patent
Iqbal et al.

(10) Patent No.: US 10,645,767 B2
(45) Date of Patent: May 5, 2020

(54) LINEAR REGULATED DIMMABLE LED DRIVER FOR DC DISTRIBUTED LIGHTING SYSTEM

(71) Applicant: QATAR UNIVERSITY, Doha (QA)

(72) Inventors: Atif Iqbal, Doha (QA); Mohammad Meraj, Doha (QA); Syed Rahman, Doha (QA); Lazhar Ben-Brahim, Doha (QA)

(73) Assignee: QATAR UNIVERSITY, Doho (QA)

( * ) Notice: Subject to any disclaimer, the term of this patent is extended or adjusted under 35 U.S.C. 154(b) by 0 days.

(21) Appl. No.: 15/963,628

(22) Filed: Apr. 26, 2018

(65) Prior Publication Data

US 2019/0335552 A1  Oct. 31, 2019

(51) Int. Cl.
H05B 33/08 (2020.01)
H02M 1/44 (2007.01)

(52) U.S. Cl.
CPC ..... *H05B 33/0812* (2013.01); *H05B 33/0824* (2013.01); *H05B 33/0845* (2013.01); *H02M 1/44* (2013.01)

(58) Field of Classification Search
CPC ............ H05B 33/0812; H05B 33/0815; H05B 33/0827; H05B 33/0845; H05B 33/0851
USPC ........................................ 315/186, 193, 307
See application file for complete search history.

(56) References Cited

U.S. PATENT DOCUMENTS

| | | | |
|---|---|---|---|
| 4,029,991 A * | 6/1977 | Schultz | H05B 33/0812 307/10.8 |
| 6,621,235 B2 | 9/2003 | Chang | |
| 7,271,642 B2 * | 9/2007 | Chen | H02M 3/07 315/291 |
| 8,319,445 B2 | 11/2012 | McKinney et al. | |
| 9,148,916 B2 | 9/2015 | Chang et al. | |
| 9,271,348 B2 * | 2/2016 | Hattrup | H05B 33/0812 |
| 2001/0043113 A1 * | 11/2001 | Hoshino | H02M 3/07 327/534 |
| 2009/0212721 A1 * | 8/2009 | Maruyama | H05B 33/0812 315/307 |
| 2011/0068703 A1 | 3/2011 | McKinney | |
| 2011/0140619 A1 * | 6/2011 | Lin | H02M 3/158 315/193 |
| 2012/0176826 A1 * | 7/2012 | Lazar | H02M 3/158 363/126 |

(Continued)

OTHER PUBLICATIONS

D. J. Hammerstrom, "AC Versus DC Distribution Systems—Did We Get it Right?", 1-4244-1298-6/07, 2007 IEEE Power Engineering Society General Meeting, 5 pages.

(Continued)

*Primary Examiner* — Tung X Le
(74) *Attorney, Agent, or Firm* — Squire Patton Boggs (US) LLP

(57) ABSTRACT

Certain embodiments may generally relate to power supplies, and more specifically to a linear regulated dimmable light-emitting diode (LED) driver for a direct current (DC) grid connected LED string. A power circuit may include a plurality of pass devices, and a plurality of biasing pass devices electrically connected to the plurality of pass devices. The power circuit may also include a compensator electrically connected to the plurality of biasing pass devices, and a sense resistor electrically connected to the plurality of pass devices, the plurality of biasing pass devices, and the compensator.

14 Claims, 19 Drawing Sheets

(56) References Cited

U.S. PATENT DOCUMENTS

| | | | | |
|---|---|---|---|---|
| 2012/0319607 A1* | 12/2012 | Watanabe | ........... | H05B 33/0818 315/206 |
| 2015/0286230 A1 | 10/2015 | Lynch | | |
| 2016/0066375 A1* | 3/2016 | Seki | ................... | H05B 33/0815 |
| 2016/0278171 A1* | 9/2016 | Jermyn | .............. | H05B 33/0815 |
| 2017/0196055 A1* | 7/2017 | Jao | ..................... | H05B 33/0815 |
| 2018/0007751 A1* | 1/2018 | Gritti | ..................... | H02M 1/08 |

OTHER PUBLICATIONS

D.M. Larruskain, et al., "Transmission and Distribution Networks: AC versus DC", 9th Spanish-Portuguese Congress on Electrical Engineering, Jul. 2005, 6 pages.

N. Rasmussen, "Increasing Data Center Efficiency by Using Improved High Density Power Distribution", APC White Paper #128, http://www.apcmedia.com/salestools/NRAN-6CN8PK_R0_EN.pdf, 10 pages.

R. Panguloori, et al., "Investigation on Choice of DC Electrical Distribution System with Lab Test Results for Office and Commercial Applications", Elsevier, Proc. of Int. Conf. on Control Communication and Power Engineering, 2013, 6 pages.

A. Bedir, et al., "The Impact of Plug-in Hybrid Electric Vehicle Interaction with Energy Storage and Solar Panels on the Grid for a Zero Energy House", In Transmission and Distribution Conference and Exposition, 2010 IEEE PES (Apr. 19-22, 2010), 6 pages.

E. Saberbari, et al., "Net-Zero Energy Building Implementation through a Grid-Connected Home Energy Management System", IEEE 19th Conference on Electrical Power Distribution Networks (EPDC), 2014., 7 pages, DOI: 10.1109/EPDC.2014.6867495.

G. Makarabbi, et al., "Compatibility and Performance Study of Home Appliances in a DC Home Distribution System", 2014 IEEE International Conference on Power Electronics, Drives and Energy Systems (PEDES), 6 pages, DOI: 10.1109/PEDES.2014.7042151.

P. Mishra, et al., "Economic Evaluation of Solar Hybrid DC Grid for Petrol Pump Stations", Annual IEEE India Conference (INDICON), 2013, 5 pages, DOI:10.1109/INDCON.2013.6726099.

H. Broeck, et al., "Power Driver Topologies and Control Schemes for LEDs", Proc. IEEE Appl. Power Electron.Conf. (APEC), 7 pages, 2007.

S. Tunga, et al., "Linear Regulator based Compact LED Driver for DC Distributed Lighting System", IEEE Power and Advanced Control Engineering (ICPACE), 2015, 7 pages, DOI: 10.1109/ICPACE.2015.7274954.

D. Hodges, "Darlington's Contributions to Transistor Circuit Design", IEEE Transactions on Circuits and Systems—I: Fundamental Theory and Applications, vol. 46, No. 1, Jan. 1999, 3 pages.

H. Kanaan, et al., "Small-Signal Average Modeling, Simulation and Carrier-Based Linear Control of a Three-Phase Four-Leg Shunt Active Power Filter", In Electric Machines & Drives Conference, 2007. IEMDC '07, IEEE International (May 3-5, 2007). vol. 1, 7 pages.

L. Li, et al., "A 16-28-W 92.8%-Efficiency Monolithic Quasi-Responant LED Driver With Constant-Duty-Radio Frequency Regulator", IEEE Transactions on Circuits and Systems vol. 62, Issue: 12, 5 pages, 2015.

B. Singh, et al. "Analysis, Design, Modeling, Simulation and Development of Single-Switch AC-DC Converters for Power Factor and Efficiency Improvement", Journal of Power Electronics, vol. 8, No. 1, 9 pages, 2008.

L. Gu, et al., "Means of Eliminating Electrolytic Capacitor in AC/DC Power Supplies for LED Lightings", IEEE Trans. Power Electron, vol. 24, No. 5, 10 pages, May 2009.

R. Erickson, et al., "Fundamental of Power Electronics", Springer, New York, 1997, pp. 411-418.

Texas Instruments, "AN-1148 Linear Regulators: Theory of Operation and Compensation" Texas Instruments, May 2013, 15 pages.

Texas Instruments, "Demystifying Type II and Type III Compensators Using Op-Amp and OTA for DC/DC Converters", Texas Instruments, Jul. 2014, 16 pages.

Renesas, Technical Brief, TB417.1—Designing Stable Compensation Networks for Single Phase Voltage Mode Buck Regulators, intersil—Dec. 2003, 11 pages.

R. Boylestad, et al., "Electronic Devices and Circuit Theory", Pearson, Tenth Edition, 934 pages.

\* cited by examiner

LINEAR REGULATED DIMMABLE LED DRIVER FOR DC DISTRIBUTED LIGHTING SYSTEM

FIELD OF THE INVENTION

Certain embodiments may generally relate to power supplies. More specifically, certain embodiments may be directed to a linear regulated dimmable light-emitting diode (LED) driver for a direct current (DC) grid connected LED string.

BACKGROUND OF THE INVENTION

Increasing energy demand has been driving research to build energy efficient systems to fulfill the needs with energy utilization. Renewable energy such as photovoltaic (PV), wind generation, fuel cell, and tidal energy have started sharing a significant percentage of load demand. Based on end user/load requirements and load demand, different concepts such as standalone renewable systems and hybrid power systems for an alternating current (AC) grid and DC distributed systems (DCDS) have been proposed. Among these, DC grid distributed systems have been gaining popularity because many office buildings, commercial spaces, sports complexes, and conference halls have used a large number of DC loads. Such DC loads include, for example, LED lighting, computers, and printers. DCDS have shown significant improvement in energy efficiency, reliability, and economic savings, leaving far behind AC grid, especially, when integrating renewable energy sources to the distribution systems.

It has been known that lighting load shares a considerable portion of total energy, and in particular, applications such as sports complexes, IT parks, and commercial buildings (CB). CB may use more than 50% of lighting loads. For energy efficient LED lighting, energy saving is about six folds than incandescent, florescent and compact florescent (CFL), and longer lasting than conventional light sources. Further, solid state lighting (LED lighting) tend to be the future in illuminating technology since LED lighting has minimal to no environmental side effects.

DC power supplies have been invariably obtained from an AC-DC converter, which makes use of extra electronic circuitry, increases component count, power loss, and harmonic distortions in the grid. The DC grid voltage level may be regulated according to end load or application. 48V DC voltage for the grid (lower voltages<220) is generally not suitable because the current requirement of the loads will be high which results in thick wiring cords leads some power losses and also generate heat, in overall it is not economic. Further, DC loads do not have reactive power demand, which causes the current rating to decrease in delivering the same amount of power.

Office spaces and commercial buildings generally have about a 40-50% lighting load, and sports complexes and stadiums generally use greater than 50% of lighting loads. Conventional LED drivers are usually based on AC-DC then switched mode DC-DC for every light fixture and the same fixture cannot operate at different power levels (dimmable). These LED fixtures generate the harmonics in the supply system and two levels of converters reduce the efficiency of the overall driver. These also lead to utilization of the capacitors, inductors, drivers for metal-oxide-semiconductor field-effect transistors (MOSFETs) and current controller integrated circuits (IC's), which leads to a higher size of the driver and high cost.

Further, conventional LED drivers consist of switching regulators that employ inductors. Inductors are usually custom made and occupy a significant footprint on the driver printed circuit board (PCB). This becomes a major bottleneck for minimizing a PCB driver footprint for high voltage applications.

There is a need, therefore to provide a power converter that transforms DC to DC with controllable current. There is also a need to provide an LED driver that achieves high voltage operation, and avoids the use of inductors and other large and expensive electronic components, while avoiding electromagnetic interference (EMI) and other issues associated with pulse-width modulation (PWM) dimmers.

SUMMARY OF THE INVENTION

According to certain embodiments, a power circuit may include a plurality of pass devices, a plurality of biasing pass devices electrically connected to the plurality of pass devices, and a compensator electrically connected to the plurality of biasing pass devices. The power circuit may also include a sense resistor electrically connected to the plurality of pass devices, the plurality of biasing pass devices, and the compensator. Further, the power circuit may include a filter electrically connected to the plurality of pass devices, and a light-emitting diode string electrically connected to the plurality of pass devices and filter.

In an embodiment, the light-emitting diode string may include a plurality of light-emitting diodes, and the filter may include a series resistor-capacitor connected in parallel to a load applied to the power circuit. According to an embodiment, the sense resistor may be configured to measure an equivalent voltage of a load current flowing in the light-emitting diode, and configured to compare the equivalent voltage with a reference voltage. In another embodiment, one of the plurality of biasing pass devices may be configured to generate a biasing voltage, and an error signal of the power circuit may be compensated by the compensator and the biasing voltage. According to another embodiment, one of the plurality of biasing devices may be configured to generate a collector current, and the collector current may be equivalent to a base current of the plurality of pass devices.

According to certain embodiments, a method for driving a power circuit may include providing a load current in the power circuit that flows in a light-emitting diode string connected to the power circuit. The method may also include measuring an equivalent voltage of the load current flowing in the light-emitting diode string, comparing the equivalent voltage with a reference voltage that is driven by a microcontroller or restrictive voltage divider circuit, and compensating an error signal by a compensator connected to the power circuit, and by a biasing voltage generated by a first biasing pass device connected to the power circuit. The method may further include drawing a base current of a plurality of pass devices connected to the power circuit for a second biasing pass device connected to the power circuit, driving a collector current of the second biasing pass device, which is equivalent to the base current, and drawing the load current by the plurality of pass devices.

In an embodiment, the method may also include controlling a light output of the light-emitting diode string by varying the load current, wherein varying the load current may include varying the biasing voltage. The method may further include sensing the load current with a sense resistor that is connected to the power circuit in series with the load current. In another embodiment, the plurality of pass devices may form a Darlington connection to provide a high current gain to the power circuit. In a further embodiment, the compensator may offer a pole at origin, one zero, and a high frequency pole, and the compensator may be configured to be boosted up to 90 degrees. In another embodiment, the method may include controlling a light output of the light-emitting diode string by way of performing analog dimming. According to another embodiment, the method may include controlling a light output of the light-emitting diode string by way of performing pulse-width modulation dimming.

According to an embodiment, a computer program product embodied in a non-transitory computer-readable medium and encoding instructions that, when executed in hardware, performs a process, the process may include providing a load current in the power circuit that flows in a light-emitting diode string connected to the power circuit, measuring an equivalent voltage of the load current flowing in the light-emitting diode string, and comparing the equivalent voltage with a reference voltage that is driven by a microcontroller or resistive voltage divider circuit. The process may also include compensating an error signal by a compensator connected to the power circuit, and by a biasing voltage generated by a first biasing pass device connected to the power circuit. The process may further include drawing a base current of a plurality of pass devices connected to the power circuit for a second biasing pass device connected to the power circuit, driving a collector current of the second biasing pass device, which is equivalent to the base current, and drawing the load current by the plurality of pass devices.

In an embodiment, the process may further include controlling a light output of the light-emitting diode string by varying the load current, wherein varying the load current includes varying the biasing voltage. According to an embodiment, the process may further include sensing the load current with a sense resistor that is connected to the power circuit in series with the load current. In another embodiment, the plurality of pass devices form a Darlington connection to provide a high current gain to the power circuit. According to a further embodiment, the compensator may offer a pole at origin, one zero, and a high frequency pole, and the compensator may be configured to be boosted up to 90 degrees. In another embodiment, the process may further include controlling a light output of the light-emitting diode string by way of performing analog dimming. According to a further embodiment, the process may further include controlling a light output of the light-emitting diode string by way of performing pulse-width modulation dimming.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

Figure 1:
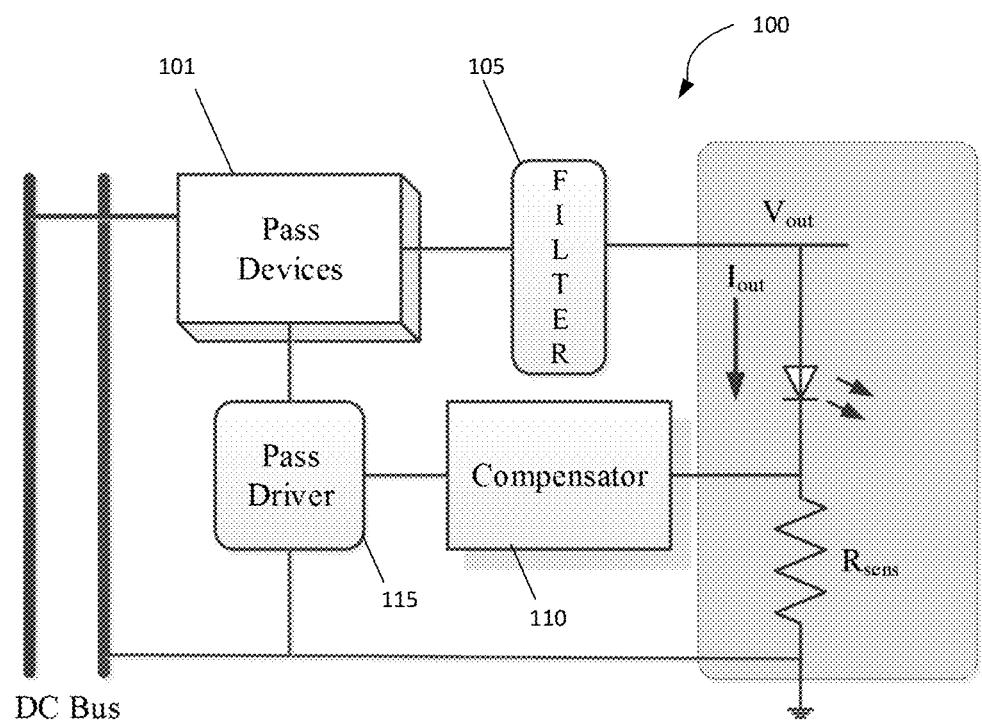
FIG. 1 illustrates a DC distribution system 100 according to certain embodiments.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

DETAILED DESCRIPTION

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

Certain embodiments are described herein for using various tools and procedures used by a software application for operating a linear regulated dimmable LED driver for a DC grid connected LED string. The examples described herein are for illustrative purposes only. As will be appreciated by one skilled in the art, certain embodiments described herein, including, for example, but not limited to, those shown in FIGS. 1-14 embodied as a system, apparatus, method, and/or computer program product. Accordingly, certain embodiments may take the form of an entirely software embodiment or an embodiment combining software and hardware aspects. Software may include but is not limited to firmware, resident software, microcode, etc. Furthermore, other embodiments can take the form of a computer program product accessible from a computer-usable or computer-readable medium providing program code for use by or in connection with a computer or any instruction execution system.

As will be described herein, any combination of one or more computer usable or computer readable medium(s) may be utilized with certain embodiments. For the purposes of this description, a computer-usable or computer readable medium can be any apparatus that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may independently be any suitable storage device, such as a non-transitory computer-readable medium. Suitable types of memory may include, but not limited to: a portable computer diskette; a hard disk drive (HDD), a random access memory (RAM), a read-only memory (ROM); an erasable programmable read-only memory (EPROM or Flash memory); a portable compact disc read-only memory (CDROM); and/or an optical storage device.

The memory may be combined on a single integrated circuit as a processor, or may be separate therefrom. Furthermore, the computer program instructions stored in the memory may be processed by the processor can be any suitable form of computer program code, for example, a compiled or interpreted computer program written in any suitable programming language. The memory or data storage entity is typically internal, but may also be external or a combination thereof, such as in the case when additional memory capacity is obtained from a service provider. The memory may also be fixed or removable.

The computer usable program code (software) that may be implemented with certain embodiments may be transmitted using any appropriate transmission media via any conventional network. Further, computer program code, when executed in hardware, for carrying out operations of certain embodiments may be written in any combination of one or more programming languages, including, but not limited to, an object oriented programming language such as Java, Smalltalk, C++, C# or the like and conventional procedural programming languages, such as the "C" programming language or similar programming languages. Alternatively, certain embodiments may be performed entirely in hardware.

Depending upon the specific embodiment, the program code may be executed entirely on an LED driver device, a user's device, partly on the user's device, as a stand-alone software package, partly on the user's device and partly on a remote computer, or entirely on the remote computer or server. In the latter scenario, the remote computer may be connected to the user's device through any type of conventional network. This may include, for example, a local area network (LAN) or a wide area network (WAN), Bluetooth, Wi-Fi, satellite, or cellular network, or the connection may be made to an external computer (for example, through the Internet using an Internet Service Provider).

According to certain embodiments, a power converter may be provided. The power converter, according to certain embodiments, may be configured to transform DC to DC with controllable current. Certain embodiments also offer a high efficiency with no total harmonic distortion in a supply grid voltage and current waveforms.

According to other embodiments, a linear regulator based LED driver may be provided. In certain embodiments, a high power high efficiency dimmable LED driver based on linear current regulator technology for DC distribution systems may be provided. The steady state model according to certain embodiments may help in selecting/keeping pass devices' ground current to a very low range, such as in the range of about 100 uA.

In DC power distribution systems of certain embodiments, a conditioning unit (e.g., controller) may regulate the output voltage with about 1-2% regulation of nominal voltage. This may lead to a design of a simpler electronic circuit to regulate the current required to drive the LED driver. In addition, the forward biased LED string voltage may be selected near to DC grid voltage, and the current regulation circuit may be designed to achieve the dimming of the light fixture.

FIG. 1 illustrates a DC distribution system 100 according to certain embodiments. The DC distribution system 100 may include pass devices 101, at least one filter 105, a compensator 110, and a pass driver 115. The DC distribution system 100 may be used to power the DC loads and applied in the integration of renewables and battery systems. The DC regulated grid voltage may be a centralized controller that prioritizes the solar PV panel (renewable energy) or battery by a DC-DC converter and a centralized AC-DC rectifier. Further, as illustrated in FIG. 1, the sense resister ($R_{sens}$) may sense the load current and form the required current in the form of voltage, which is controlled by a compensator whose gain and bandwidth are selected in such a way to maintain the load current to a desired set value.

Figure 2:
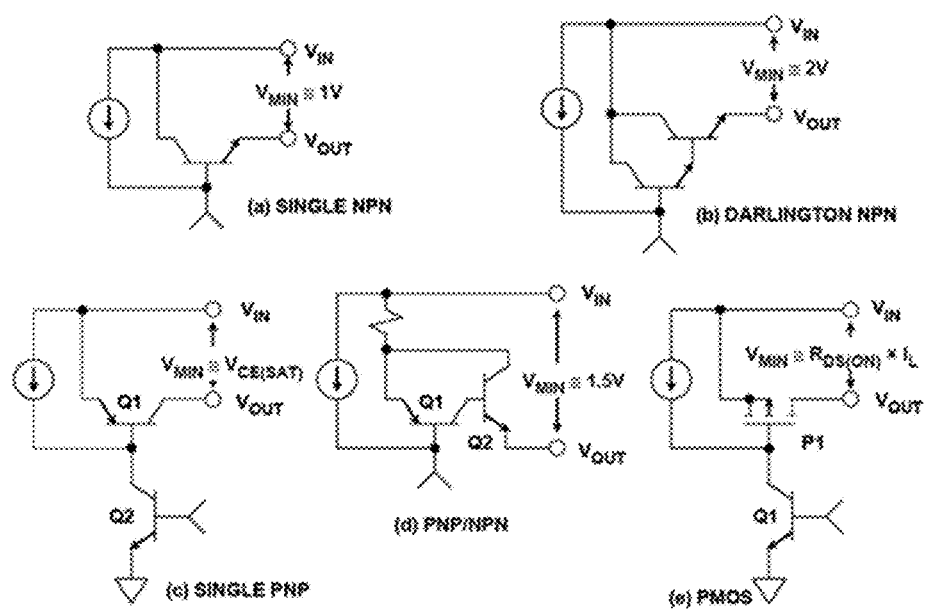
FIG. 2 illustrates various pass device configurations according to certain embodiments.

FIG. 2 illustrates various pass device configurations according to certain embodiments. More particularly, FIG. 2 illustrates configurations of various linear regulator pass devices for a voltage level, ground current requirement, and dropout voltage. In FIG. 1, the sense resistor ($R_{sens}$) senses the load current and forms the required current in the form of voltage, which may be controlled by a compensator whose gain and bandwidth are selected in such a way to maintain the load current to a desired set value.

As illustrated in FIG. 2, pass device (a) corresponds to a single NPN transistor in order to achieve low voltage regulators. In pass device (a), the base of high gain bipolar junction transistor (BJT) may be easily driven with an error amplifier gain. In certain embodiments, the current range may be increased up to 1 A with the help of a high gain BJT.

FIG. 2 also illustrates pass device (b), which incorporates Darlington NPN pairs. The Darlington NPN pairs may have a very high gain. As such, the current output may be greater. In addition, FIG. 2 illustrates pass device (c), which similar to pass device (a), incorporates a single NPN. Further, (c) differs from pass device (a) in that pass device (c) varies other parameters such as stability (output capacitor), output impedance, and so on. The configuration of pass device (c) may be implemented in various embodiments described herein.

Further, FIG. 2 illustrates pass device (d), which incorporates a combination of PNP and NPN transistors. Here, there is a high input voltage regulator configuration because to drive the main NPN transistor (power BJT), the PNP BJT is used. Further, to increase the load current, instead of a single NPN BJT, it is possible to use Darlington NPN BJTs. FIG. 2 also illustrates pass device (e), a p-type metal-oxide-semiconductor may be used. The metal-oxide-semiconductor field-effect transistor (MOSFET) may act like a resistor when it is conducting. As such, this configuration may be used at very low-level regulators.

Figure 3A:
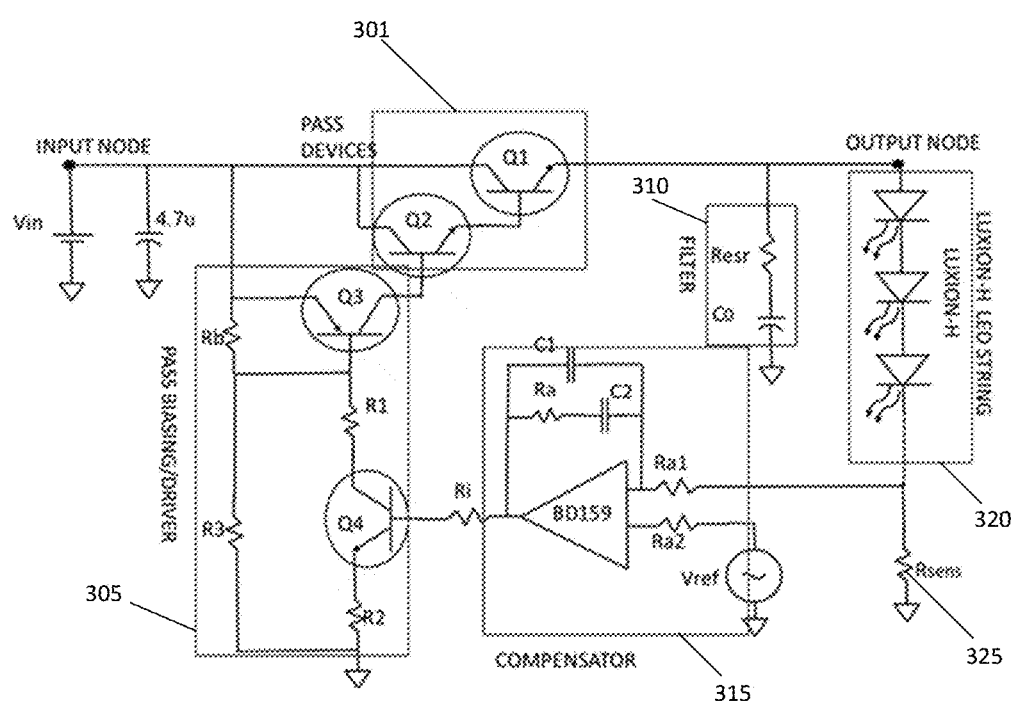
FIG. 3(a) illustrates a power circuit of a linear regulator according to certain embodiments.

FIG. 3(a) illustrates a power circuit of a linear regulator according to certain embodiments. As illustrated in FIG. 3(a), the driver circuit may include an LED string 320, and the driver circuit may be divided into stages of pass devices: pass devices 301; biasing/driving pass devices 305; compensator/controller 315; and sense resistor 325. In certain embodiments, the driver circuit may also include a load and filter 310. In other embodiments, the equivalent voltage of the load current flowing in the LEDs may be measured with a simple resistor $R_{sens}$. The equivalent voltage may also be compared with a reference voltage $V_{ref}$, which may be driven by a small microcontroller or resistive voltage divider circuit. In addition, according to certain embodiments, the error signal may be compensated by a type II controller (e.g., a compensator), and a biasing voltage may be generated at the base of transistor Q4. This biasing voltage may draw the base current for PNP transistor Q3, and drive the collector current of Q3. In certain embodiments, the collector current of Q3 may be equivalent to the base current of the pass devices (Q1 and Q2). Further, according to certain embodiments, the high gain Darlington connected transistors Q1 and Q2 (pass devices) may draw the load current.

According to certain embodiments, the pass devices 301 may be semiconductor-based switches that regulate the current flowing to the load. In certain drivers for low voltage, pass devices may absorb the voltage difference between the power supply and the output load. Different possible configurations may be used for low voltage operations that are illustrated in FIG. 2. To minimize the ground current (base current), the current gain of the pass devices may be high. The pass devices of certain embodiments may achieve high current gain. This means with low ground current, it may be possible to operate the pass devices for high voltage applications.

In certain embodiments, the pass devices may need proper biasing for operation in the cutoff/saturation region. Thus, the pass biasing/driver 305 may provide the necessary biasing to the pass devices. Further, the base current for the pass devices may vary according to the control signal Vref.

In certain embodiments, the filter 310 may include a series resistor-capacitor (RC) connected in parallel to the load, and may be configured to regulate the voltage and to filter out high frequency transients. Further, the compensator 315 illustrated in FIG. 3(a) may be configured to dim the performance of the LED driver, and achieve dimming and wide operating range. In certain embodiments, the compensator 315 may also be an op-amp based type-II controller.

According to certain embodiments, the LED driver may achieve high voltage operation without any bulky inductor or capacitor in the circuit. This makes it possible to minimize the size of the driver. Further, minimization of the ground current may be achieved by application of the pass device configuration of certain embodiments, which makes it suitable for high voltage application and also minimizes the power consumption of the LED driver. Therefore, according to certain embodiments, it may be possible to minimize a PCB driver footprint for high voltage applications.

Figure 3B:
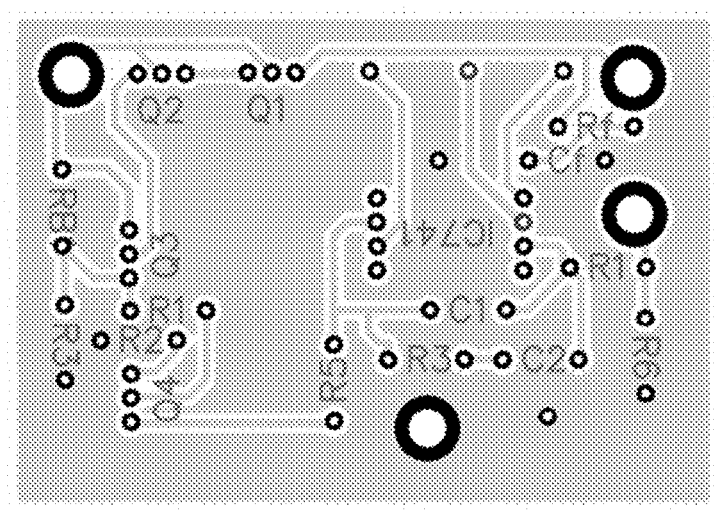
FIG. 3(b) illustrates a printed circuit board (PCB) according to certain embodiments.
Figure 3C:
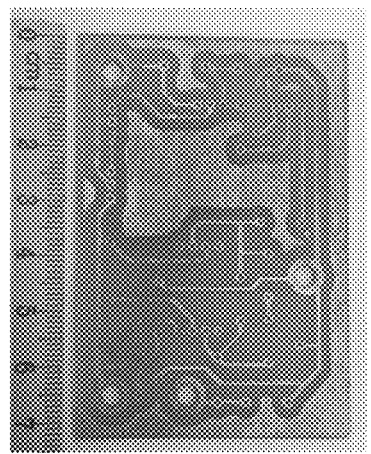
FIG. 3(c) illustrates one side of the PCB of FIG. 3(b) according to certain embodiments.
Figure 3D:
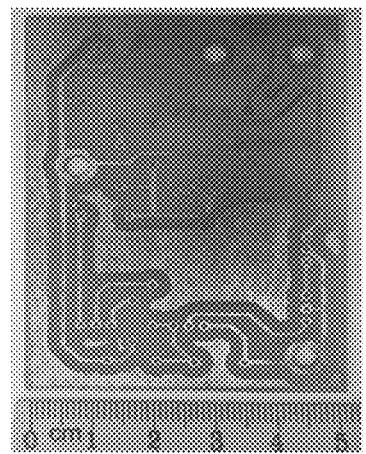
FIG. 3(d) illustrates another side of the PCB of FIG. 3(b) according to certain embodiments.

FIG. 3(b) illustrates a PCB according to certain embodiments. Further, FIG. 3(c) illustrates one side of the PCB of FIG. 3(b) according to certain embodiments, and FIG. 3(d) illustrates another side of the PCB of FIG. 3(b) according to certain embodiments. According to certain embodiments, the PCB may be printed out and etched onto a single-sided copper clad PCB board. In other embodiments, components of the driver may be soldered on the PCB. The driver according to certain embodiments may also be optimized to reduce the size for commercial applications.

Figure 3E:
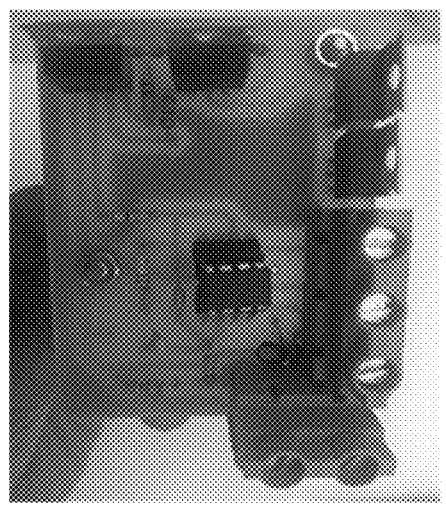
FIG. 3(e) illustrates an LED driver PCB with components soldered thereon according to certain embodiments.

FIG. 3(e) illustrates an LED driver PCB with components soldered thereon according to certain embodiments. The LED driver may be tested with a 205 input DC voltage source. In addition, a voltmeter may be connected across the LED and current flowing through the LED may be measured by an ammeter. When using the driver according to certain embodiments, the brightness of the LED driver may be varied from about 20% brightness up to 100% brightness in steps of 20%. During this variation of brightness, the current through the ammeter may vary according to the luminous intensity or brightness of the driver. Furthermore, in certain embodiments, the current through the LED may vary linearly according to the brightness of the LED.

Figure 4:
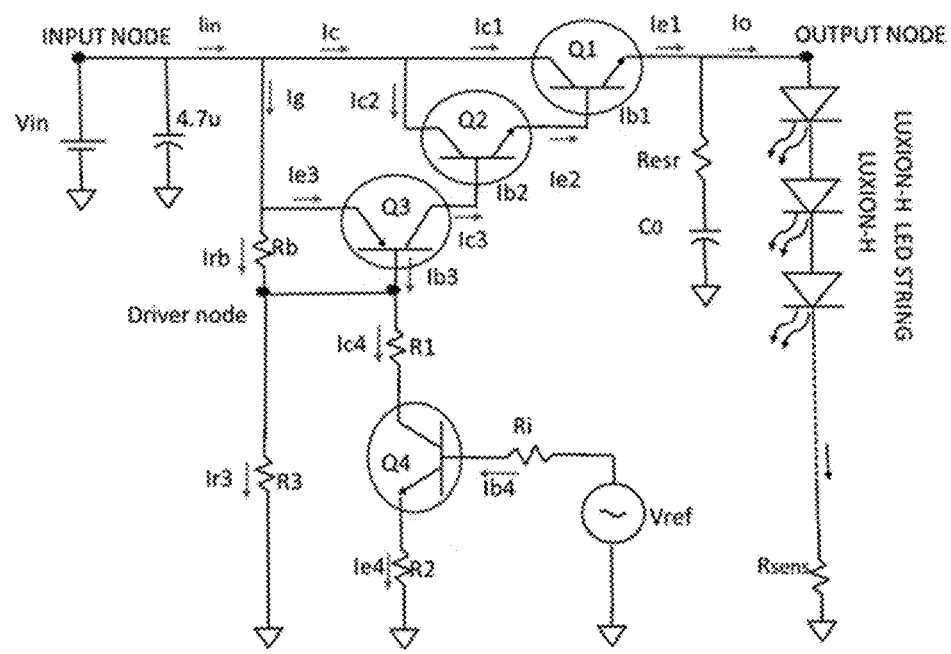
FIG. 4 illustrates a linear LED driver according to certain embodiments.

FIG. 4 illustrates a linear LED driver according to certain embodiments. According to certain embodiments, a steady state analysis of the linear LED driver illustrated in FIG. 4 with all the branch currents shown, may be performed. Transistors Q1 and Q2 may form the Darlington connection of the main pass components of the driver to provide high current gain to the driver. With minimum ground current flowing in the driver circuit, a high load current may be achieved. Further, Q3 and Q4 may form the driver circuit for the main pass transistors. Biasing of these transistors may require the base current to be injected to get the load current.

Since light output is directly proportional to the current in the LED, a variable LED current may provide the dimming characteristic. According to certain embodiments, this current may be directly varied by varying the biasing voltage, which in turn controls the base current of the power transistors (Darlington). In addition, a large enough resistance for $R_3$ may be selected to limit the current flowing into the ground as it is directly connected to the supply input DC grid, and creates a DC supply for the driver circuit. Further, according to certain embodiments, the load current may be sensed by $R_{sens}$ placed in series with the load, and this sensed voltage may in turn be used by a compensator to control the regulator.

According to certain embodiments, from a transistor steady state model, it is possible to derive the following equation:

$$I_e = I_c + I_b \text{ and } I_{c1} = \beta_1 I_{b1}, I_{c2} = \beta_2 I_{b2}, I_{c3} = \beta_3 I_{b3}, I_{c4} = \beta_4 I_{b4}$$

$$I_{c1} = I_{e1}, I_{c2} = I_{e2}, I_{c3} = I_{e3}, I_{c4} = I_{e4} \qquad (1)$$

Further, applying Kirchhoff's Current Law (KCL) at the Darlington collector node, the following may be obtained:

$$I_c = I_{c1} + I_{c2}$$

$$I_c = \beta_1 I_{b1} + \beta_2 I_{b2}$$

$$I_c = \beta_1 I_{e2} + \beta_2 I_{b2}$$

$$I_c = \beta_1 (I_{c2} + I_{b2}) + \beta_2 I_{b2}$$

$$I_c = \beta_1 (\beta_2 I_{b2} + I_{b2}) + \beta_2 I_{b2}$$

$$I_c = (\beta_1 + \beta_2 + \beta_1 \beta_2) I_{b2}$$

$$I_{b2} = I_{c3} = \beta_3 I_{b3}$$

$$I_c = (\beta_1 + \beta_2 + \beta_1 \beta_2) \beta_3 I_{b3} \qquad (2)$$

From equation (1), the load current is directly proportional to the ground current flowing in the driver circuit. As such, it may be possible to obtain a lesser ground current, and increase the efficiency of the system. Moreover, in certain embodiments, the following additional equations may be obtained:

$$I_{in} = I_c + I_g \qquad (3)$$

$$I_g = I_{e3} + I_{rb} = I_{e3} + \frac{V_{be3}}{R_b} = I_{e3} + \frac{0.7}{R_b} = (1+\beta_3)I_{b3} + \frac{0.7}{R_b} \qquad (4)$$

$$I_{b3} = \frac{I_{c3}}{\beta_3} = \frac{I_{b2}}{\beta_3} = \frac{1}{\beta_3}\left(\frac{I_{c2}}{\beta_2}\right) = \frac{1}{\beta_3}\left(\frac{I_{e2}}{\beta_2}\right) = \frac{1}{\beta_3}\left(\frac{I_{b1}}{\beta_2}\right) = \frac{1}{\beta_3}\left(\frac{I_{c1}}{\beta_2 \beta_1}\right) = \frac{1}{\beta_3}\frac{I_o}{\beta_2 \beta_1} \qquad (5)$$

Applying KCL at the driver node, the following may be obtained:

$$I_{b3} + \frac{V_{be3}}{R_b} = I_{c4} + \frac{V_{in} - V_{be3}}{R_3} \qquad (6)$$

$$I_{b3} + \frac{V_{be3}}{R_b} = I_{c4} + \frac{V_{in} - V_{be3}}{R_3} \qquad (7)$$

Substituting equation (5) into equation (7) results in the following:

$$I_{c4} = \frac{I_o}{\beta_3 \beta_2 \beta_1} + \frac{V_{be3}}{R_b} - \frac{V_{in} - V_{be3}}{R_3} \qquad (8)$$

Then applying Kirchhoff's Voltage Law (KVL) at the Q4 base emitter biasing loop, the following may be obtained:

$$V_{ref} = I_{e4} R_2 + V_{be4} + I_{b4} R_i \qquad (9)$$

$$V_{ref} = I_{e4} R_2 + V_{be4} + \frac{I_{e4} R_i}{\beta_4} \qquad (10)$$

-continued $$V_{ref} = V_{be4} + \left(\frac{R_i}{\beta_4} + R_2\right) I_{e4} \qquad (11)$$

Then, substituting equation (8) into equation (11) results in the following:

$$V_{ref} = V_{be4} + \left(\frac{R_i}{\beta_4} + R_2\right)\left(\frac{I_o}{\beta_3 \beta_2 \beta_1} + \frac{V_{be3}}{R_b} - \frac{V_{in} - V_{be3}}{R_3}\right) \qquad (12)$$

As shown above, equation (12) gives the biasing voltage necessary for driving the load current into the LED light fixture. By using equation (12), the necessary values of $R_i$ may be chosen.

Figure 5A:
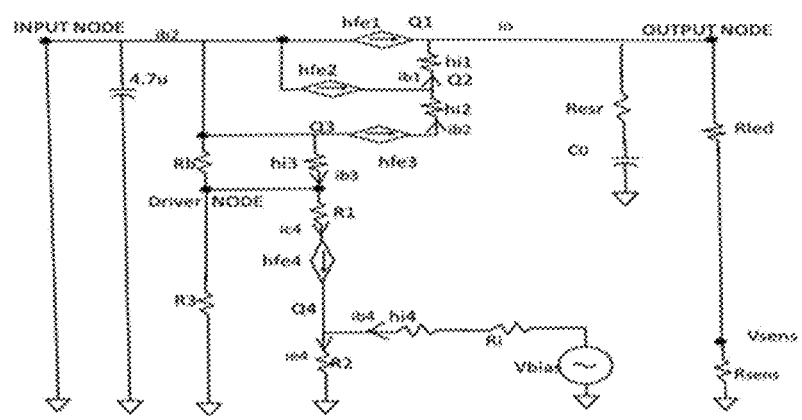
FIG. 5(a) illustrates a small signal model circuit according to certain embodiments.
Figure 5B:
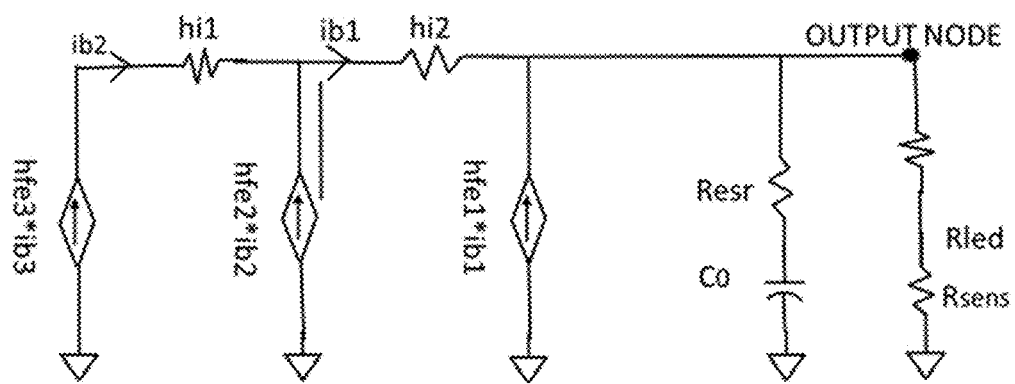
FIG. 5(b) illustrates a sub-circuit (a) of the small signal model circuit in FIG. 5(a) according to certain embodiments.
Figure 5C:
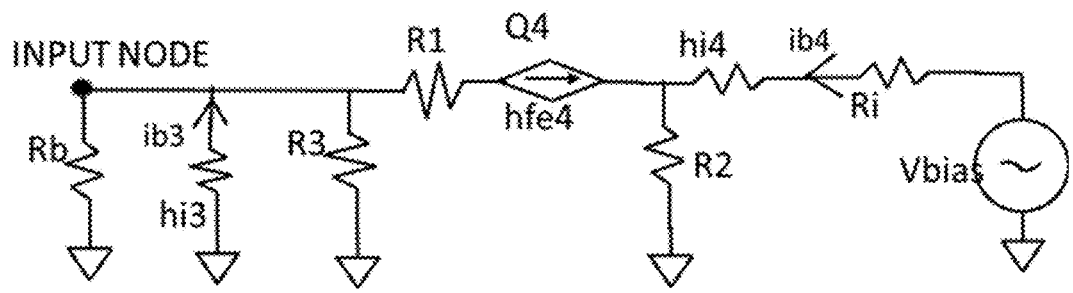
FIG. 5(c) illustrates a sub-circuit (b) of the small signal circuit in FIG. 5(a) according to certain embodiments.

FIG. 5(a) illustrates a small signal model circuit according to certain embodiments. Further, FIG. 5(b) illustrates a sub-circuit (a) of the small signal model circuit in FIG. 5(a) according to certain embodiments. In addition, FIG. 5(c) illustrates a sub-circuit (b) of the small signal circuit in FIG. 5(a) according to certain embodiments. According to certain embodiments, a small signal model may be used to determine the stability of the linear LED driver of certain embodiments. Finding the stability of the linear LED driver circuit may lead to the ability to design a controller that obtains desired output current for proper dimming of the LED light fixtures.

From FIGS. 5(a)-5(c), the following may be obtained:

$$I_o = \frac{(1+h_{f1})}{1+\dfrac{R_{led}+R_{sens}}{R_{esr}+\dfrac{1}{sC}}} I_{b1} \qquad (13)$$

$$I_o = K_1 I_{b1} \qquad (14)$$

$$I_{b1} = (1+h_{f2})I_{b2}$$

$$I_{b1} = K_2 I_{b2} \qquad (15)$$

$$I_{b2} = h_{f3} I_{b3}$$

$$I_{b2} = K_3 I_{b3} \qquad (16)$$

$$I_{b3} = \frac{R_b R_3 h_{f4}}{R_b R_3 + h_{i3}(R_b + R_3)} I_{b4}$$

$$I_{b3} = K_4 I_{b4} \qquad (17)$$

$$I_{b4} = \frac{1}{R_o + h_{i3} + (1+h_{f4})R_2} V_{bias}$$

$$I_{b4} = K_5 V_{bias} \qquad (18)$$

By simplifying the above equations, the following may be obtained:

$$I_o = K_1 K_2 K_3 K_4 K_5 V_{bias} \qquad (19)$$

$$K_1 = \frac{(1+h_{f1})}{1+\dfrac{R_{led}+R_{sens}}{R_{esr}+\dfrac{1}{sC}}} \quad K_2 = (1+h_{f2}) \quad K_3 =$$

$$h_{f3} \quad K_4 = \frac{R_b R_3 h_{f4}}{R_b R_3 + h_{i3}(R_b + R_3)} \quad K_5 = \frac{1}{R_o + h_{i3} + (1+h_{f4})R_2}$$

$$I_o = G_{plant} V_{bias}, \text{ here } G_{plant} = K_1 K_2 K_3 K_4 K_5$$

-continued $$V_{sens} = I_o R_{sens} \quad (20)$$

$$V_{sens} = G_{plant} V_{bias} R_{sens}$$

$$\frac{V_{sens}}{V_{bias}} = G_{plant} R_{sens}$$

From the h-parameter model of the devices $h_f$ and $h_i$ values and component values such as $R_o$ and $R_b$, the plant transfer function may be found.

Figure 6:
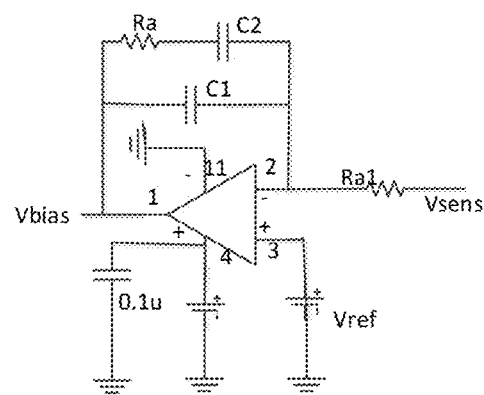
FIG. 6 illustrates a selected compensator electrical circuit according to certain embodiments.

FIG. 6 illustrates a selected compensator electrical circuit according to certain embodiments. According to certain embodiments, the controller or compensator may be designed to regulate the current flowing in the LED fixture to obtain the desired light output (current a light output). Thus, in certain embodiments, a type II compensator may be selected to make the overall closed loop transfer function (control-to-output cascade with error amplifier) satisfy the stability criteria. The type II compensator may offer a pole at origin, one zero, and a high frequency pole. The type II compensator may also boost up to 90 degrees.

Figure 7:
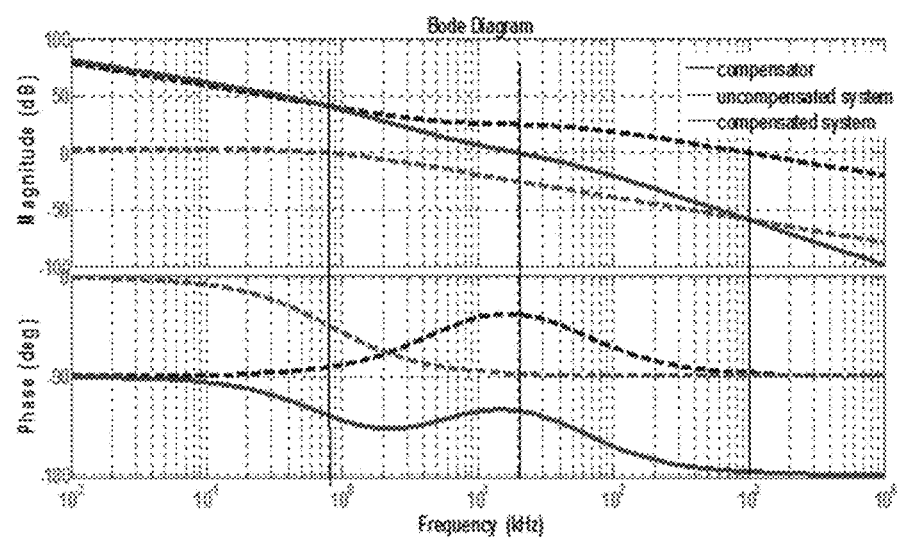
FIG. 7 illustrates a bode diagram according to certain embodiments.

FIG. 7 illustrates a bode diagram according to certain embodiments. More specifically, FIG. 7 illustrates a bode diagram of a compensator, uncompensated system, and compensated system. As illustrated in FIG. 7, the bode diagram includes a graph of the frequency response of the compensator, an uncompensated system, and a compensated system. The bode diagram includes a bode magnitude plot measured in dB, which expresses the magnitude of the frequency response. Further, the bode diagram includes a phase plot measured in degrees, which expresses the phase shift of the frequency response. According to certain embodiments, a compensator function may be provided as follows:

$$G(s) = \frac{V_{bias}(s)}{V_{sens}(s)} = -\frac{1 + R_a C_2 s}{R_{a1} s (C_1 + C_2 + R_a C_1 C_2 s)} \quad (21)$$

In equation (21) it may be assumed that $C_2 \gg C_1$, and for the middle frequencies, $\omega_z \ll \omega \ll \omega_p$. The compensator transfer function may have a zero at $$\omega_z = -\frac{1}{R_a C_1}$$

and a pole at $$\omega_p = -\frac{1}{R_a C_2}.$$

In addition, the gain at maximum phase of the compensator may be:

$$|G(s)| = \left|\frac{R_a}{R_{a1}}\right| \quad (22)$$

Further, the gain cross over frequency of the compensator may be:

$$\omega_{co} = \sqrt{\omega_z \omega_p} \quad (23)$$

In addition, the phase of the compensator may be:

$$\emptyset = -180 + \tan^{-1}\frac{\omega}{\omega_z} - 90 + \tan^{-1}\frac{\omega}{\omega_p} \quad (24)$$

From the bode diagram in FIG. 7, the uncompensated system shows a phase of 45 degrees at a crossover frequency of about 820 Hz and also at about 20 k Hz. In addition, the uncompensated system has a gain of about −25 dB and a phase of about 88°. According to certain embodiments, the compensator may achieve an overall compensated systems phase margin of about 55° at 20 kHz crossover frequency. In addition, from FIG. 7, at 20 kHz, the gain of the uncompensated system is about 25 db. From this, it is possible to obtain: $\emptyset = PM - \emptyset_{un} = 55 - (-88) = 143$. After solving equations (21)-(24), at $R_{a1} = 1$ k, the values of $C_1 = 159$ nF, $C_2 = 1.59$ uF, and $R_a = 17.7$ k. The bode plot of the compensated system illustrated in FIG. 7 has high gain, infinite gain margin, and a phase margin of 57° at 20 kHz.

The LED driver with controller according to certain embodiments may be designed and simulated in LT spice software. Further, actual LUXEON®-H high voltage LEDs may be modeled in LT spice software to obtain the VI characteristics given in the data sheet. A simulation schematic in LT spice software, simulation results at analog (continuous current) dimming at rated conditions, and simulation results at PWM current dimming at rated conditions are illustrated in FIGS. 8-10, respectively.

Figure 8:
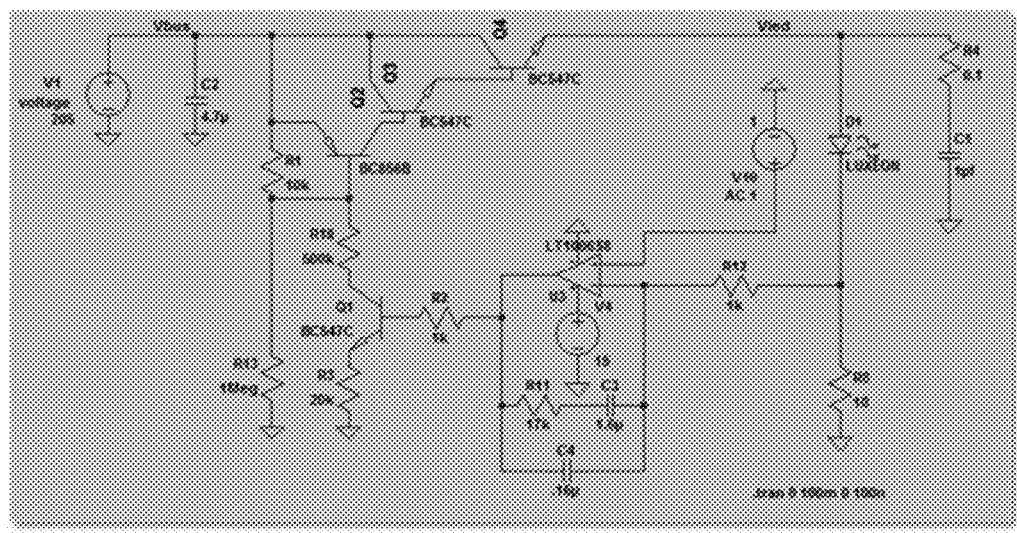
FIG. 8 illustrates a schematic simulation in LT spice software according to certain embodiments.

FIG. 8 illustrates a schematic simulation in LT spice software according to certain embodiments. Here, the LED driver of certain embodiments may be modeled in simulation software LT spice. The specification of the components used in the simulation may be obtained from design steps. According to certain embodiments, the components of the LED driver illustrated in FIG. 8 may be designed while considering steady state and small signal mathematical models. FIG. 8 illustrates a DC distribution system, pass biasing, pass device, filter, compensator, and LED load. The actual modeling of LUXEON—High Voltage LED may be done to obtain simulation results close to actual performance.

Figure 9:
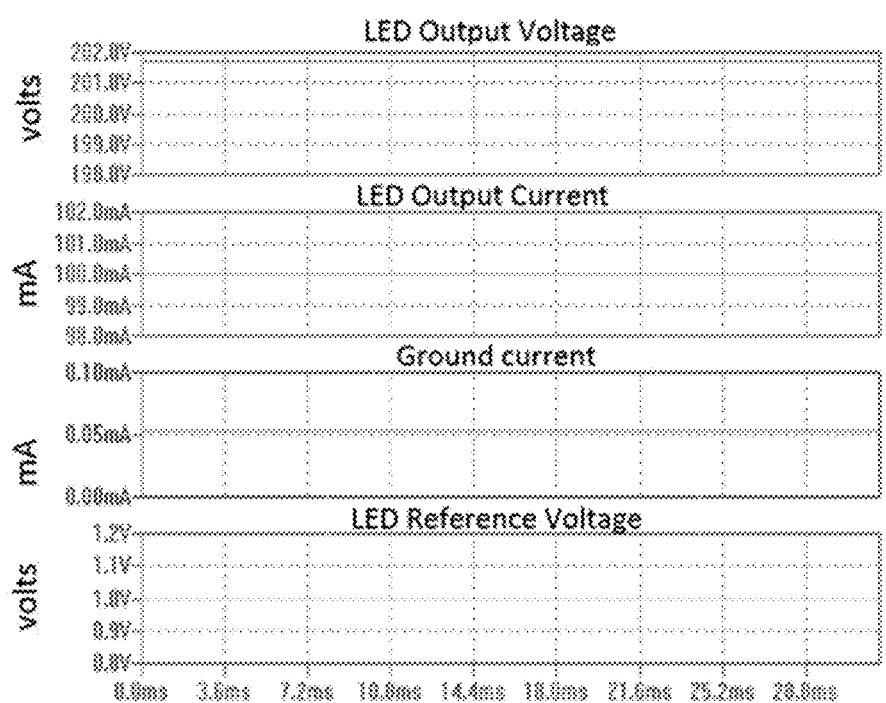
FIG. 9 illustrates simulation results at analog (continuous current) dimming at rated conditions according to certain embodiments.

FIG. 9 illustrates simulation results at analog (continuous current) dimming at rated conditions according to certain embodiments. For instance, performance of the LED driver with constant current reduction (CCR) of certain embodiments is illustrated in FIG. 9. In particular, LED brightness may be directly proportional to the current flowing through it. To achieve the desired dimming of the LED, current flowing through it may be controlled by the application of a reference voltage to the compensator. As such, steady state performance of the LED driver for a given dimming may be given in FIG. 9.

Figure 10:
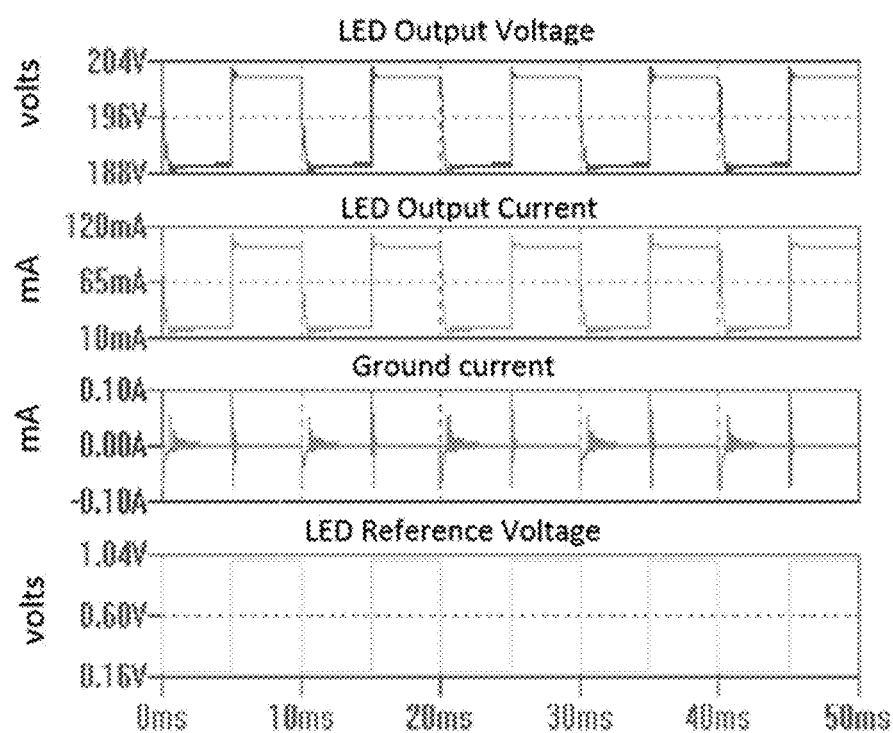
FIG. 10 illustrates simulation results at PWM current dimming at rated conditions according to certain embodiments.

FIG. 10 illustrates simulation results at PWM current dimming at rated conditions according to certain embodiments. In particular, FIG. 10 illustrates the performance for varying reference voltage of the LED driver of certain embodiments. In certain embodiments, by varying the reference voltage, output current control may be achieved. The LED output voltage for varying dimming intensity is also illustrated in FIG. 10.

With respect to analog dimming according to certain embodiments, the current may flow continuously at a set amount for a given light level. Since the amount of light output is proportional to the current flowing through the LED, the current may be reduced to reduce the brightness of the LED.

According to certain embodiments, a mechanism for dimming may be by way of analog dimming CCR. By definition, PWM power supplies may run at frequencies high enough to be imperceptible to the human eye. The higher the frequency, the less likely flicker may be observed. Frequencies below 200 Hz may be observable in peripheral vision, and even higher frequencies may be required to eliminate stroboscopic effects in fast motion environments. However, higher-frequency power supplies may generally be more complex and expensive to manufacture, especially when low light levels are desired. Other programs may place minimum requirements on PWM frequency.

Due to fast rising and falling edges of a PWM driver (faster edges allow for higher frequencies and lower light levels), EMI can be generated. This EMI may not be suitable for certain applications. Further, due to the fast edges of PWM drivers, the PWM drivers may experience performance issues if mounted remotely from the light source. This may be due to the electrical characteristics, such as capacitance and inductance, of the long wire runs interfere with the fast rise and fall times required for precise light levels.

According to certain embodiments, there may be several suitable applications for analog dimming CCR. These may include, for example, applications where long wire runs may exist between the driver and the light engines, and high performance dimming is required. The applications may also include applications that may have strict EMI requirements, such as medical suites. In addition, the applications may include applications with high motion activity or rotating machinery.

According to certain embodiments, another mechanism for dimming may include PWM dimming. In PWM dimming, LEDs may have a rated current, which is the amount of current that needs to flow to get the maximum light output (lumens). Further, PWM dimming may involve switching of current at a high frequency between zero and the rated output current. This means that the LED load may either be off or running at its rated current (full load). Thus, in PWM, the ratio of on time to off time may determine the LED brightness.

According to certain embodiments, in PWM, LED specification sheets may provide a particular characteristic, such as color or efficiency (in lumens per watt) at a particular forward current. These characteristics may vary based on the forward current. For example, the color temperature may be 3000K at 700 mA of current, but only 2700K at 350 mA. A PWM driver in certain embodiments may only run the LEDs at the rated current level or zero, preventing these characteristics from changing as the load is dimmed. This means that according to certain embodiments, the same color temperature may be maintained throughout the dimming range.

In other embodiments, PWM based dimming may provide a precise output level since the LEDs are usually on at the same current level. Changing the operating current linearly, as done with CCR (analog dimming), may not result in a linear change in light output. Further, PWM dimming may be suitable in fixtures that must be dimmed lower than 40% and still maintain consistent color. In addition, PWM dimming may be suitable for color mixing applications because of their need for precise levels of each color.

Figure 11:
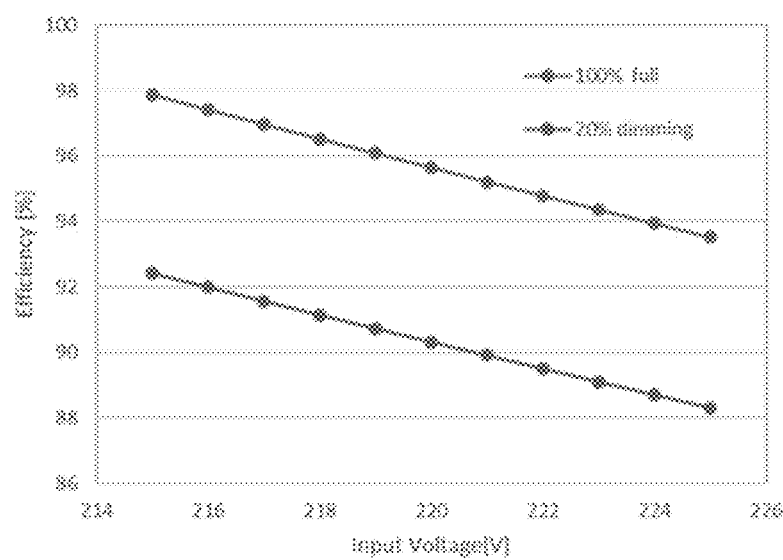
FIG. 11 illustrates variation of efficiency with input voltage variation according to certain embodiments.
Figure 12:
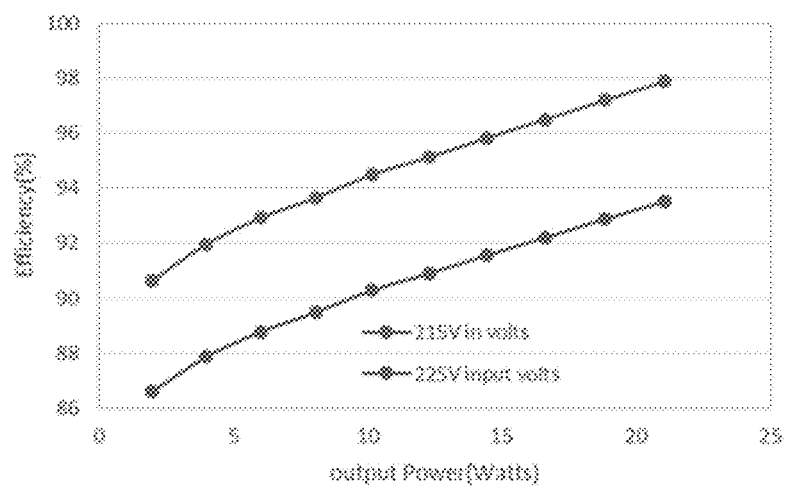
FIG. 12 illustrates variation of efficiency with dimming (output power) variation according to certain embodiments.

FIG. 11 is a graphical illustration of variation of efficiency with input voltage variation according to certain embodiments. Further, FIG. 12 is a graphical illustration of variation of efficiency with dimming (output power) variation. According to certain embodiments, when forward voltage increases, the current flowing in the LED also increases. Further, as the DC bus voltage varies, the efficiency of the LED driver may decrease. The pass devices may be continuous to supply the load current and to block the difference between the input and output voltage. As the input voltage increases, the drop across the pass devices increases, which leads to a decrease in efficiency. Thus, according to certain embodiments, the DC bus voltage regulation may be maintained within the maximum efficiency of the LED driver.

Figure 13:
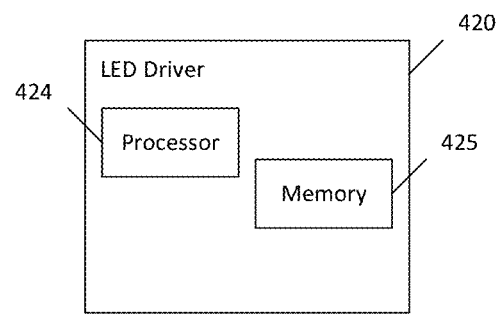
FIG. 13 illustrates an LED driver according to certain embodiments.

FIG. 13 illustrates an LED driver according to certain embodiments. It should be understood that each block of FIGS. 1-12 and 14, or any combination thereof, may be implemented by various means or their combinations, such as hardware, software, firmware, one or more processors and/or circuitry. In one embodiment, more than one LED driver may be included, although only one LED driver 420 is shown for the purposes of illustration. While the systems, methods, and apparatus are described in the foregoing context, acts and operations described hereinafter may also be implemented in hardware.

The LED driver 420 may include at least one processor 424 for processing information and executing instructions or operation. Processor 424 may be any type of general or specific purpose processors. While a single processor 424 is shown for the LED driver 420 in FIG. 13, multiple processors may be utilized in each device according to other embodiments. In fact, processor 424 may include one or more general-purpose computers, special purpose computers, microprocessors, central processing units (CPU), digital signal processors (DSPs), field-programmable gate arrays (FPGAs), application-specific integrated circuits (ASICs), and processors based on a multi-core processor architecture, as examples, or other comparable devices. The processor 424 can be implemented as a single controller, or a plurality of controllers or processors.

At least one memory (internal or external) can be provided in each device, and indicated as 425. The memory may include computer program instructions or computer code contained therein. The processor 424 and memory 425, or a subset thereof, can be configured to provide means corresponding to the various blocks and processes shown in FIGS. 1-12 and 14.

Memory 425 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer instructions can be configured, with the processor for each device, to cause a hardware apparatus such as LED driver 420 to perform any of the processes described herein (see, for example, FIGS. 1-12 and 14). Therefore, in certain embodiments, a non-transitory computer-readable medium can be encoded with computer instructions that, when executed in hardware, perform a process such as any one of the processes described herein. Accordingly, in certain embodiments, a non-transitory computer-readable medium can be encoded with computer instructions that, when executed in hardware, perform any of the processes described herein. Alternatively, certain embodiments of the invention can be performed entirely in hardware.

Figure 14:
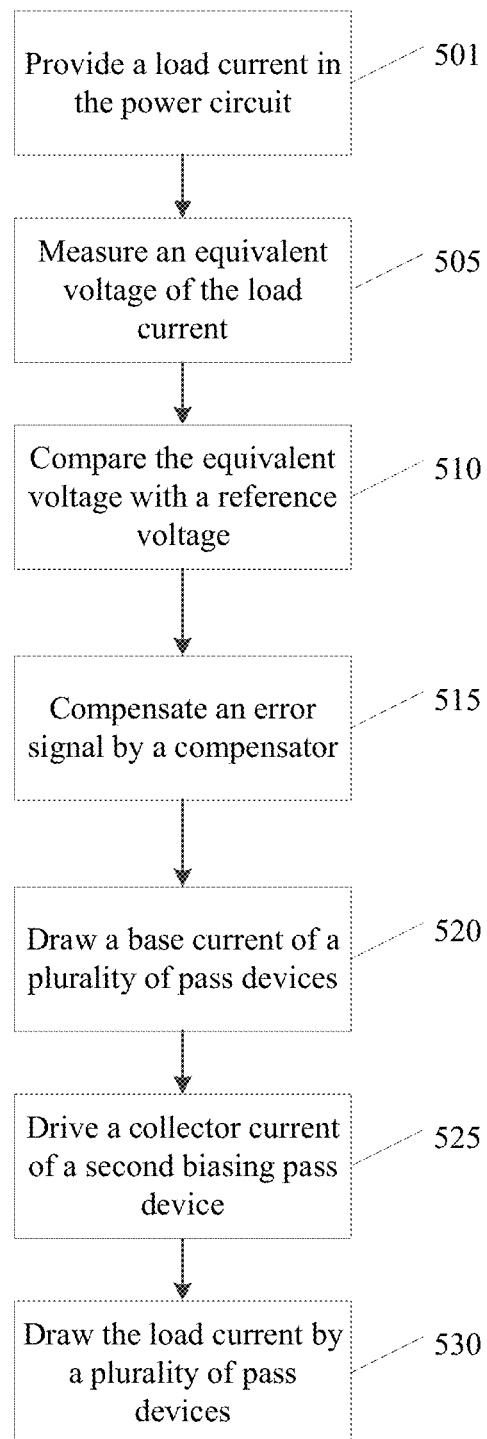
FIG. 14 illustrates an exemplary flow diagram of a method according to certain embodiments.

FIG. 14 illustrates an exemplary flow diagram of a method according to certain embodiments. According to certain embodiments, the method illustrated in FIG. 14 may be performed by an LED driver, such as the LED driver of the embodiments described above. At 501, the method may include providing a load current in the power circuit that flows in a light-emitting diode string connected to the power circuit. At 505, the method may include measuring an equivalent voltage of the load current flowing in the light-emitting diode string. Further, at 510, the method may include comparing the equivalent voltage with a reference voltage that is driven by a microcontroller or resistive voltage divider circuit. In addition, at 515, the method may include compensating an error signal by a compensator connected to the power circuit, and by a biasing voltage generated by a first biasing pass device connected to the power circuit. Further, at 520, the method may include drawing a base current of a plurality of pass devices connected to the power circuit for a second biasing pass device connected to the power circuit. At 525, the method may include driving a collector current of the second biasing pass device, and at 530, the method may include drawing the load current by the plurality of pass devices.

According to certain embodiments therefore, it may be possible to provide and/or achieve various advantageous effects and improvements in computer technology. For instance, according to certain embodiments, it may be possible to offer a high efficiency with no total harmonic distortion in a supply grid voltage and current waveforms. It may also be possible to provide a linear regulated dimmable LED driver that can be applied in: green buildings and net zero energy buildings (NZEB); commercial buildings with energy efficiency lighting and HVAC systems; sport complexes and/or stadiums; dimming and remote control features of LED fixtures helpful in efficient presentation of speakers in conference halls, meeting rooms, seminar halls, and auditoriums; decorative, sign boards, and hoarding systems; street lighting systems; battery powered applications or stand-alone applications.

According to other embodiments, it may be possible to provide a linear regulated dimmable LED driver that avoids the use of inductors and other large and expensive electronic components, while avoiding EMI and other issues associated with PWM dimmers. It may also possible to provide an inductor and capacitor less LED driver for high power and high voltage applications. Further, it may be possible to provide remote control operations for dimming the light output, and may be possible to achieve compact and low cost for the LED driver. In addition, according to certain embodiments, ground leakage current may be very low of the order of about 100 µA, and it may be possible to provide an LED driver that can be used for a wide range of LED ratings.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:
1. A method for driving a power circuit, comprising:
providing a load current in the power circuit that flows in a light-emitting diode string connected to the power circuit;
measuring an equivalent voltage of the load current flowing in the light-emitting diode string;
comparing the equivalent voltage with a reference voltage that is driven by a microcontroller or resistive voltage divider circuit;
compensating an error signal by a compensator connected to the power circuit, and by a biasing voltage generated by a first biasing pass device connected to the power circuit;
drawing a base current of a plurality of pass devices connected to the power circuit for a second biasing pass device connected to the power circuit;
driving a collector current of the second biasing pass device, which is equivalent to the base current; and
drawing the load current by the plurality of pass devices.

2. The method of claim 1, further comprising controlling a light output of the light-emitting diode string by varying the load current,
wherein varying the load current comprises varying the biasing voltage.

3. The method of claim 1, further comprising sensing the load current with a sense resistor that is connected to the power circuit in series with the load current.

4. The method of claim 1, wherein the plurality of pass devices form a Darlington connection to provide a high current gain to the power circuit.

5. The method of claim 1,
wherein the compensator offers a pole at origin, one zero, and a high frequency pole, and
wherein the compensator is configured to be boosted up to 90 degrees.

6. The method of claim 1, further comprising controlling a light output of the light-emitting diode string by way of performing analog dimming.

7. The method of claim 1, further comprising controlling a light output of the light-emitting diode string by way of performing pulse-width modulation dimming.

8. A computer program product embodied in a non-transitory computer-readable medium and encoding instructions that, when executed in hardware, performs a process, the process comprising:
providing a load current in the power circuit that flows in a light-emitting diode string connected to the power circuit;
measuring an equivalent voltage of the load current flowing in the light-emitting diode string;
comparing the equivalent voltage with a reference voltage that is driven by a microcontroller or resistive voltage divider circuit;
compensating an error signal by a compensator connected to the power circuit, and by a biasing voltage generated by a first biasing pass device connected to the power circuit;
drawing a base current of a plurality of pass devices connected to the power circuit for a second biasing pass device connected to the power circuit;
driving a collector current of the second biasing pass device, which is equivalent to the base current; and
drawing the load current by the plurality of pass devices.

9. The computer program product of claim 8, wherein the process further comprises controlling a light output of the light-emitting diode string by varying the load current,
wherein varying the load current comprises varying the biasing voltage.

10. The computer program of claim 8, wherein the process further comprises sensing the load current with a sense resistor that is connected to the power circuit in series with the load current.

11. The computer program product of claim 8, wherein the plurality of pass devices form a Darlington connection to provide a high current gain to the power circuit.

12. The computer program product of claim 8,
wherein the compensator offers a pole at origin, one zero, and a high frequency pole, and
wherein the compensator is configured to be boosted up to 90 degrees.

13. The computer program product of claim 8, wherein the process further comprises controlling a light output of the light-emitting diode string by way of performing analog dimming.

14. The computer program product of claim 8, wherein the process further comprises controlling a light output of the light-emitting diode string by way of performing pulse-width modulation dimming.

\* \* \* \* \*